United States Patent

Besier

[15] 3,663,750

[45] May 16, 1972

[54] AUTOMATIC BEAM BLANKING CIRCUIT FOR AN ELECTRONIC VIDEO PLAYER

[72] Inventor: Emil E. Besier, Chicago, Ill.

[73] Assignee: Motorola, Inc., Franklin Park, Ill.

[22] Filed: Mar. 16, 1971

[21] Appl. No.: 124,789

[52] U.S. Cl. ....................178/7.2, 178/DIG. 28

[51] Int. Cl. ....................H04n 1/22

[58] Field of Search ....................178/7.2, 6.7 A, DIG. 28

[56] References Cited

UNITED STATES PATENTS 3,234,326 2/1966 Goldmark et al. ..............178/DIG. 28

*Primary Examiner*—Robert L. Griffin
*Assistant Examiner*—George G. Stellar
*Attorney*—Mueller & Aichele

[57] ABSTRACT

An electronic video player having a flying spot scanner for producing a raster to scan the film being reproduced therein is capable of operation in a play mode, with the film continuously moving through a film gate where it is scanned, or in a still mode, where movement of the film is stopped and repeated scanning of the stopped film in the film gate is effected. The raster is collapsed for the still mode of operation, and a circuit operates automatically to cut off the beam in the flying spot scanner tube after a predetermined time of operation in the still mode to prevent excessive phosphor burn of the flying spot scanner screen for the collapsed raster.

8 Claims, 2 Drawing Figures

Patented May 16, 1972 3,663,750

INVENTOR
EMIL E. BESIER
BY Mueller & Aichele
ATTORNEYS

AUTOMATIC BEAM BLANKING CIRCUIT FOR AN ELECTRONIC VIDEO PLAYER

BACKGROUND OF THE INVENTION

In an electronic video player, a film carrying the video information is continuously moved past a film gate with the player in a normal play mode of operation for producing video signals to be reproduced as an image in a television receiver. A flying spot scanner cathode-ray tube produces a scanning raster in the form of a beam of light to scan the moving film, with the beam passing through the film being applied to a photo-multiplier tube which produces corresponding electrical signals. These signals then are utilized to form the television signal required to operate the television receiver which reproduces the image on the film. When the player is operated in a "still" mode of operation, the flying spot scanner tube raster must be the standard 4:3 aspect ratio to scan the single desired frame.

When the player is operated in the "play" mode of operation to produce signals corresponding to a moving video image in accordance with the information recorded on the film, the film travels past the film gate at 60 frames per second. Since the vertical sweep of the flying spot scanner beam is 60 Hertz, the normal 4:3 aspect ratio of the raster no longer can be used; because the film is traveling at the same speed in the vertical direction as the light from the scanner and therefore could not properly be scanned in the vertical direction. As a consequence, the scanner vertical size is doubled for the "play" mode of operation; so that the scanner tube continues to be swept vertically 60 times per second; but the distance the beam travels is twice as far in the same length of time. Thus, the beam is traveling twice as fast (vertically) as it does when the player is operated in the "still" mode of operation.

With the player operating in the "play" mode of operation, scanning starts at the top of the upper frame of two frames which appear in the window of the film gate. By the time the lower edge of this upper frame reaches the lower edge of the film gate, the vertical scan is just being completed at the lower edge of the frame. Upon retrace, the vertical scan commences again at the top of the upper frame which now appears at the upper portion of the film gate.

When the player is operated in a "still" mode of operation, it is necessary to collapse the vertical portion of the raster to form the standard 4:3 raster since no longer is there any necessity for compensating for the motion of the film through the film gate. When this collapsed raster is used, phosphor burn of the collapsed raster area on the screen of the flying spot scanner can become sufficient that it is noticeable when the player once again is returned to its "play" mode of operation with the expanded raster. This phosphor burn is visible in the reproduced television image as a darker portion which covers the area of the scan occupied by the collapsed raster. As a consequence, it is necessary to prevent excessive phosphor burn from occurring when the player is operated in its "still" mode of operation.

SUMMARY OF THE INVENTION

It is an object of this invention to provide an improved electronic video player.

It is an additional object of this invention to provide a protection circuit for the flying spot scanner cathode-ray tube of an electronic video player.

It is yet another object of this invention to protect the flying spot scanner of an electronic video player from excessive phosphor burn when the player is being operated in a still mode of operation.

It is a further object of this invention automatically to cut off the beam in the flying spot scanner of an electronic video player a predetermined time interval after the player is placed in a still mode of operation.

In accordance with a preferred embodiment of this invention, an electronic video film player has film transporting apparatus for continuously moving film past a film gate with the player operated in a "play" mode of operation. The player includes the flying spot scanner which produces a beam to generate a moving spot of light on the display screen thereof in a raster with a predetermined horizontal to vertical aspect ratio for scanning the moving film at the film gate. The player also includes a provision for stopping movement of the film to operate the player in a "still" mode of operation in which the flying spot scanner is used to repeatedly scan the stopped film at the film gate. Since the film no longer is moving, the aspect ratio of the flying spot scanner raster is collapsed or compressed vertically to a standard aspect ratio. To prevent operation of the flying spot scanner with the smaller raster for an unnecessarily long period of time, which could result in excessive phorphor burn on the portion of the scanner cathode-ray tube screen used to reproduce the smaller raster, an automatic protection circuit is provided.

The protection circuit includes a first switch which is operated to one or the other of first and second positions corresponding to a "play" mode and a "still" mode of operation for the player corresponding to operation with moving and stopped films, respectively. A static latching switch is provided with a conductive path therethrough completed when the first switch is placed in its second position and which is opened when the first switch is placed in its first position. The static latching switch is triggered into conduction by the application of a trigger pulse thereto and this pulse is obtained from an interval timer which is responsive to operation of the switch means from its first to its second position. The interval timer provides a timer output pulse a predetermined time interval after such operation, so long as the switch means remains set to its second position. When the timer output pulse is applied to the static latching switch, the static latching switch is rendered conductive and operates on a blanking circuit to cause blanking of the beam in the flying spot scanner so long as the static latching switch remains conductive.

DETAILED DESCRIPTION

Figures 1, 2:
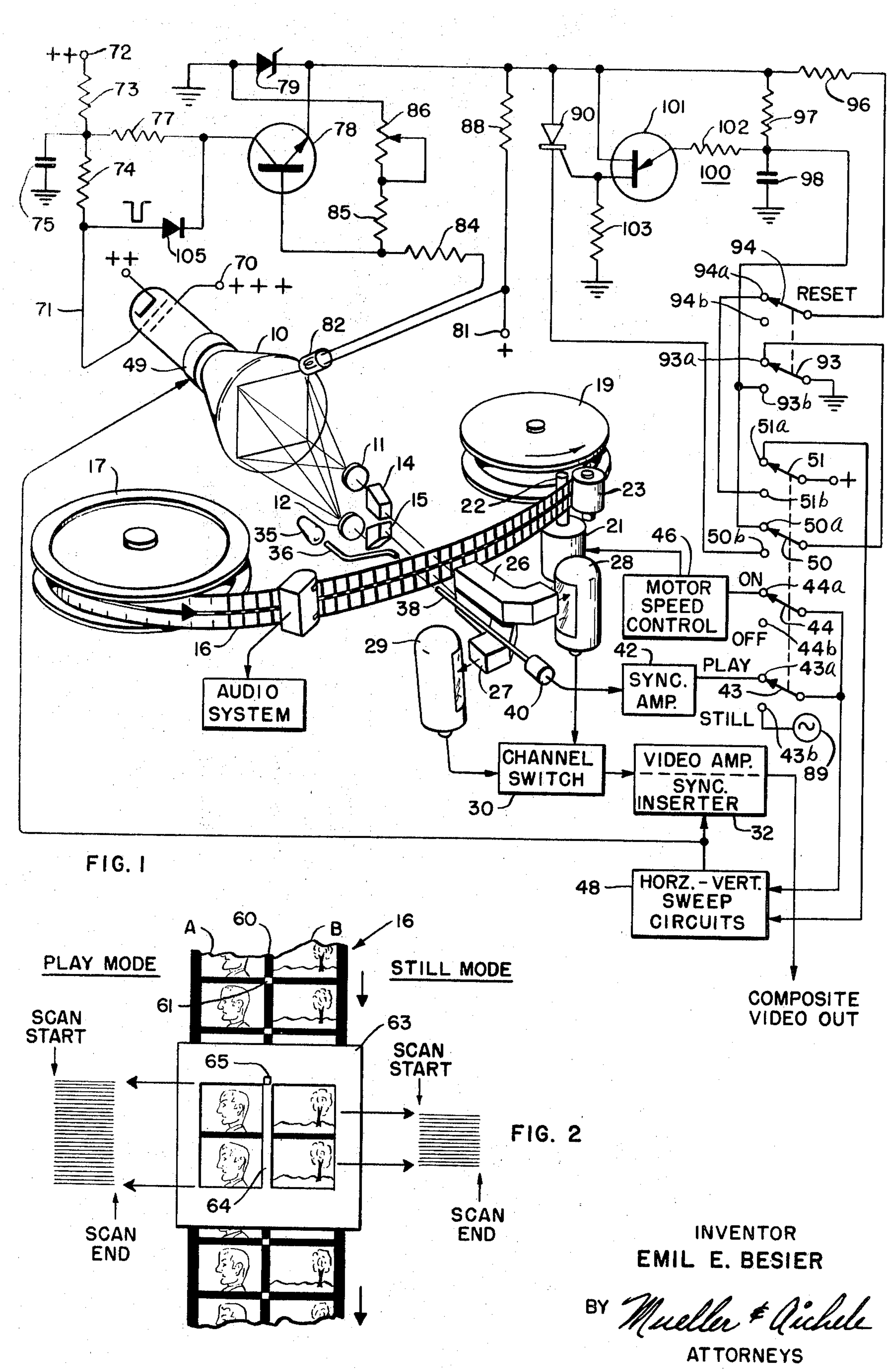
FIG. 1 is a combined mechanical and electrical circuit diagram, partially in block form, of a preferred embodiment of the invention.
FIG. 2 illustrates the different rasters of the flying spot scanner tube for the different modes of operation of the player shown in FIG. 1.

Referring now to FIG. 1, there is shown in illustrative form portions of an electronic video player of the type with which the protection circuit of a preferred embodiment of this invention operates. In a typical electronic video film player, a flying spot scanner cathode-ray tube 10 is used to develop scanning rasters to scan frames of film to which the player responds by generating signals supplied to a conventional television receiver, which then reproduces the images recorded on the film on the screen thereof. The flying spot scanner tube 10 is of a conventional type and operates to produce a raster on the phosphor screen thereof at the vertical and horizontal line frequencies used in conventional television receivers. As shown in FIG. 1, the horizontal lines of the raster as reproduced on the television screen are produced vertically on the screen of the flying spot scanner 10 due to the direction of movement of the film as shown in the drawing, with the vertical raster proceeding from left to right across the face or screen of the flying spot scanner tube 10 shown in FIG. 1.

In a typical electronic video player, the spot of light tracing the raster on the screen of the flying spot scanner tube 10 is focused by upper and lower lenses 11 and 12, forming part of a dual lens system, to a pair of corresponding prisms 14 and 15, the output surfaces of which are located adjacent a film gate (not shown in FIG. 1) past which the film is moving. The light beam passing through the prisms 14 and 15 moves in accordance with the raster on the face of the screen of the flying spot scanner 10, but is traced at the film gate in rasters substantially reduced in size by the action of the lenses 11 and 12 to correspond to the size of each frame of the film gate. As indicated in illustrative manner in FIG. 1, the film 16 is removed from a film cartridge 17, intercepts the path of the light beams emanating from the prisms 14 and 15, and is wound up on a take-up reel 19. The drive for the film is effected by means of a synchronous motor 21 operating a capstan 22 against which the film is pressed by action of a pressure roller 23.

In a conventional electronic video player the film is continuously moved, unlike the operation of a motion picture projector in which the film stops momentarily at the film gate or shutter for reproduction. The light beam emanating from the prisms 14 and 15 is modulated in accordance with the images present on upper and lower tracks of the film. These tracks correspond to two different channels of information which can be two separate black and white video channels. Or one of the channels can be the luminance channel for a color television signal, with the other channel being encoded with the color information, so that the composite of both channels acts to provide a complete color television signal.

The modulated light beams, after passing through the two channels on the film 16 in front of the prisms 14 and 15 are collected by upper and lower collector prisms 26 and 27, respectively, and supplied to a pair of photomultiplier tubes 28 and 29, respectively, the outputs of which are electrical representations of the modulated light beams passing through the film 16. These outputs of the photomultiplier tubes 28 and 29 are applied to a channel selection switch 30, which may be operated to select one or the other of the outputs of the photomultiplier tubes 28 or 29 for black and white information. In addition the channel switch 30 may be operated to a color position to simultaneously channel the information from both photomultiplier tubes 28 and 29 to a video amplifier and synchronizing signal inserter circuit 32, the output of which constitutes the desired composite video output signal which then may be supplied to a conventional television receiver for reproduction therein.

To provide the necessary synchronizing signals for insertion into the composite signal applied to the video amplifier circuit 32 and for ensuring that the motor 21 drives the film 16 precisely at 60 frames per second, a synchronizing track is provided on the film 16 between the upper and lower channels or tracks. This synchronizing track is opaque, with the exception that between each frame a small transparent window or "-hole" is provided. A lamp 35 applies light continuously to a light pipe 36 which is aligned with the center of the film 16 on the same side as the prisms 14 and 15. Light from the end of the light pipe 36 passes through the windows in the synchronizing track and is collected by a corresponding light pipe 38 on the collector side of the film 16.

The light collected by the light pipe 38 is applied to a suitable photosensitive device in the form of a photo-cell or light-dependent-resistor 40 which provides synchronizing signal output pulses at a frequency determined by he speed at which the film 16 moves past the end of the light pipe 36. These output pulses are applied to a synchronizing amplifier circuit 42, the output of which with the player in its "play" mode, is coupled through a first set of switch contacts 43*a* and 43 and a second set of switch contacts 44*a* and 44 to the input of a motor speed control circuit 46 which controls the speed of operation of the motor 21 to cause the motor 21 to drive the film 16 past the film gate at 60 frames per second. With the movable contact 44 connected to the upper contact 44*a* marked "on" at the input of the motor speed control circuit 46, power also is applied to the motor 21 causing it to operate. The upper stationary switch contacts 43*a* and 44*a* correspond to the "play" mode of operation of the player.

The output of the amplifier circuit 42 also is applied through the movable contact 43 to an input of a horizontal and vertical sweep circuit 48 to control the generation of the horizontal and vertical deflection signals at the proper frequencies, and these deflection signals are applied from the output of the circuit 48 to a deflection yoke 49 located on the neck of the flying spot scanner cathode-ray tube 10. The output of the horizontal and vertical sweep circuit 48 also is applied to the video amplifier and sync inserter circuit 32 to supply the necessary synchronizing signals for combination with the video information signals to produce a complete composite video output signal as required by a television receiver.

The movable switch contacts 43 and 44 are ganged for simultaneous operation with another pair of movable switch contacts 50 and 51, also shown in the upper position for operation of the player in its "play" mode. The movable contact 51 is connected to a source of positive operating potential B+ and applies this potential through the now closed upper stationary contact 51*a* to another input of the horizontal and vertical sweep circuit system 48. This positive potential applied during the play mode causes the vertical raster produced when the positive potential is applied to the circuit 48 through the switch 51 to be double the size of the vertical raster when the film 16 is stopped for a "still" mode of operation.

Although both tracks on the film 16 are scanned simultaneously due to the action of the lenses 11 and 12 and the prisms 14 and 15, a single raster is produced on the screen of the flying spot scanner 10, so that for purposes of illustration consider only one track at a time. Referring to FIG. 2 there are shown two tracks or channels A and B of a portion of the film 16. These tracks each constitute a plurality of individual frames similar to those on ordinary motion picture film. Between the two tracks A and B is the synchronizing signal track 60 with synchronizing holes or windows 61 appearing between each frame on the tracks A and B. The film 16 moves in the direction of the vertical arrow (downwardly as shown in FIG. 2) past a film gate 63, which is located between the prisms 14 and 15 and the film 16 in an apparatus of the type diagrammatically indicated in FIG. 1.

The film gate 63 has a pair of openings each of sufficient width (in the vertical direction as shown in FIG. 2) to accommodate two full frames of information on the corresponding channels A and B of the film 16 and simultaneously exposes the frames of both channels to the beams of light emanating from the prisms 14 and 15. The portion of the film gate 63 overlying the synchronizing channel 60 is an opaque interconnecting portion 64, and a synchronizing light aperture 65, corresponding to the size of the synchronizing windows 61 in the film, is provided for passing light from the light pipe 36 to the light pipe 38 as the film 16 travels across the film gate 63.

With the player of FIG. 1 operated in the "play" mode the film travels past the film gate 63 at 60 frames per second. The vertical sweep of the flying spot scanner 10 is 60 Hertz, to correspond to the vertical sweep of the television receiver which is to be used to reproduce the signal. Thus, it is apparent that if the film is scanned by the flying spot of light from the scanner tube in the same direction of film travel with the normal 4:3 aspect ratio employed in television receivers, the film could not be properly scanned in the vertical direction since the film is traveling at the same speed as the light from the scanner in the vertical direction.

As a consequence, the scanner vertical raster size is doubled, as indicated in FIG. 2 by the "play" mode "start scan" and "end scan" illustrated to the left of the film gate 63 in FIG. 2. The scanner tube 10 still sweeps vertically 60 times per second, but the distance that the beam travels is twice as far in the same length of time. This means that the beam is traveling twice as fast vertically as it would for a normal 4:3 aspect ratio. Scanning starts at the top of the upper frame (as viewed in FIG. 2) with the film moving past the film gate 63, and this frame is completely scanned by the time its bottom edge reaches the bottom of the film gate 63. Blanking then occurs, and then the beam retraces to the top of the next frame (the one above the one just scanned) and the process is repeated for each frame. By doubling the conventional vertical portion of the raster to form an expanded 4:6 ratio for the raster, proper scanning of the moving film 16 is obtained to cause a reproduction of the single frame of picture information on the channel being scanned for each vertical cycle of the flying spot scanner raster.

Of course, for operation of the circuit in either its "play" or "still" mode of operation, it is necessary to generate a beam in the flying spot scanner cathode-ray tube 10. This is accomplished by applying a relatively high potential B++ to the cathode of the flying spot scanner 10. Similarly, the G2 grid is supplied with B+++ on a terminal 70, with the G1 grid being supplied with a potential over a lead 71. The magnitude of this G1 potential controls the beam intensity and also effects beam blanking.

For normal operation of the circuit, in which a beam of uniform intensity is produced in the flying spot scanner tube 10, the operating potential for the G1 grid of the flying spot scanner tube 10 is obtained from a source of B++ applied to an input terminal 72 and through a resistor divider 73 and 74 to the G1 grid. The junction of the resistors 73 and 74 is connected through a filter capacitor 75 to ground and also is connected through an additional resistor 77 to the collector of an NPN beam current control transistor 78, the emitter of which is coupled through a zener diode 79 to ground. An operating bias for the transistor 78 is obtained from a source of B+ potential applied to a terminal 81 coupled to a light dependent resistor 82. The resistor 82 is placed to sense the intensity of the raster on the screen of the flying spot scanner tube 10, and the resistance of the resistor 82 varies in accordance with the intensity of the light on the screen, increasing as the intensity of the flying spot is reduced.

The light dependent resistor 82 is connected as part of a voltage divider connected between the terminal 81 in series with a pair of resistors 84 and 85 and a potentiometer 86 to ground. Adjustment of the tap on the potentiometer 86 is used to effect a variation in the voltage at the junction of the resistors 84 and 85, and this voltage is applied as a biasing potential to the base of the transistor 78 to cause it to conduct at a predetermined conduction level less than saturation. The zener diode 79 is connected in series with a resistor 88 to the B+ terminal 81 and establishes a predetermined biasing potential on the emitter of the transistor 78. The collector of the transistor 78 in turn establishes the operating potential applied over the lead 71 to the G1 grid.

Thus, the initial intensity of the beam in the cathode-ray tube 10 may be adjusted by adjusting the potentiometer 86. Similarly, as the phosphors on the display screen of the tube 10 age, a beam of higher intensity is required to produce the same light output therefrom. The resistance of the light dependent resistor 82 is selected to become greater for lower detected light levels to cause a reduction in the voltage applied in the base of the transistor 78, thereby reducing its conductivities so that the potential at its collector and therefore the potential applied over the lead 71 to the G1 grid of the cathode-ray tube 10 rises.

Blanking of the beam in the flying spot scanner tube 10 for the deflection retrace intervals of the horizontal and vertical sweep circuits 48 may be effected in any conventional manner by reducing the potential on the cathode, G1 or G2 grid of the cathode-ray tube. Such conventional blanking circuits have not been shown in FIG. 1.

Now consider the operation of the player in the "still" mode of operation. When it is desired to operate in this manner, it is necessary to stop the movement of the film 16 through the film gate 63 and to cause it to remain stationary. This is effected by moving the movable ganged switch contacts 43, 44, 50, and 51 to the lower stationary contacts **43*b*, 44*b*, 50*b*, and 51*b* shown in FIG. 1. Movement of the switch contact 44 to engage the lower contact 44*b* causes the synchronizing signal inputs to the motor speed control circuit 46 to be removed. When this occurs, the motor speed control circuit 46 operates to cease supplying operating power to the motor 21, and the motor stops operating so that the capstan 22 no longer rotates. Thus, the film 16 stops moving. At the same time, movement of the contact 43 to the "still" position shown in the drawing connects the contact 43 to a source of 60 Hertz reference signal 89 through the contact 43*b* to continue to supply the necessary 60 Hertz synchronizing signals to the sweep circuit 48**.

Movement of the contact 51 to the lower contact **51*b* breaks the circuit path which formerly applied B+ through the upper contact 51*a* to the sweep circuit 48 to thereby interrupt the application of the added voltage which was utilized to form the expanded vertical raster. With this source of B+ removed from the input to the sweep circuit 48, the vertical raster size is reduced so that the raster reproduced on the screen of the flying spot scanner tube 10 is the standard 4:3 ratio for operation in the "still" mode. This is indicated in FIG. 2 at the right-hand side of the film gate 63 with an illustration of the collapsed raster which now is used to scan the film appearing in the windows of the film gate 63**.

As illustrated in FIG. 2, this collapsed raster commences in the middle of the upper frame of the two frames of pictures present in the film gate opening and terminates in the center of the lower frame. As a result, a centering control is provided on a typical player to center a single frame between the "scan start" and "scan end" portions of the vertical raster, so that a proper image is reproduced in he television receiver supplied with the signals from the tape player.

It is apparent that with the raster area on the face or screen of the flying spot scanner tube 10 being reduced to half that which is employed when the film is moving through the tape player, increased burn-in or phosphor aging of the portion of the screen used to produce the smaller raster will be effected. If the player is operated for a prolonged period of time in the "still" mode, the phosphor burn-in or aging which causes a darkening of the portion of the screen being used to produce the raster becomes visibly apparent in the reproduced image when the player once again is switched back into its "play" mode of operation with an expanded vertical raster. This occurs since the portions of the cathode-ray tube screen which are employed for both the expanded and compressed rasters reproduce a darker spot of light than those areas of the screen which are not used during the "still" mode of operation.

To reduce the noticeable difference in the brightness of portions of the picture reproduced after resumption of operation of the player in its "play" mode of operation, a circuit is provided for automatically blanking or cutting off the beam in the flying spot scanner tube 10 after a predetermined time interval (of the order of 90 seconds) if the ganged switches 43, 44, 50, and 51 remain closed to the lower position shown in the drawing. This automatic protection circuit includes a static latching switch in the form of a silicon controlled rectifier 90 the anode of which is connected to the emitter of the transistor 78 and the cathode of which is connected to the lower stationary contact **50*b*. When he movable contact 50 engages the lower stationary contact 50*b*, a path is completed from the cathode of the silicon controlled rectifier 90 to ground through the upper stationary contact 93*b* and movable contact 93 of a reset switch also including an upper movable contact 94. Thus, a conductive path for the silicon controlled rectifier 90 is established with the movable contact 50 in its lower position. It is apparent that this conductive path is broken by opening the cathode circuit for the silicon controlled rectifier 90 when the contact 50** is moved to its upper position.

When the movable contact 51 is placed in its lower position for the "still" mode of operation, positive potential is applied through the contacts 51, **51*b* the contacts 94*a* and 94 of the reset switch, and first and second resistors 96 and 97 to a timing capacitor 98 of a unijunction oscillator circuit 100. The values of the resistors 96 and 97 determine the charging rate of the capacitor 98. The unijunction relaxation oscillator 100 includes a unijunction transistor 101, the emitter of which is connected through a coupling resistor 102 to the junction of the upper terminal of the capacitor 98 with the resistor 97**.

Operating potential for the base-two electrode of the unijunction transistor 101 is obtained from he terminal 81 through the resistor 88 and also is obtained from the junction of the resistors 96 and 97.

When the charge on the capacitor 98 attains a predetermined level, the unijunction transistor 101 fires and conducts a pulse of current through its base-two/base-one circuit to produce a positive-going pulse across the base-one load resistor 103 connected to ground. The positive-going pulse produced across the resistor 103 is applied to the gate of the silicon controlled rectifier 90 to operate as a trigger or gating pulse for the silicon controlled rectifier 90 and drives the rectifier 90 into conduction. As is well known, once the silicon controlled rectifier 90 commences conduction, it remains conductive through the path established to ground through the closed switch contacts 50, 50*b* and 93, 93*a*.

This effectively places the anode of the silicon controlled rectifier 90 only slightly above ground potential, thereby substantially reducing or lowering the potential on the emitter of the NPN-transistor 78. Since the potential applied to the base of the transistor 78 remains unchanged, the transistor 78 is driven into heavy conduction or saturation, producing a negative-going potential across a diode 105 connected between the lead 71 and the collector of the transistor 78. This negative-going potential drops the potential applied over the lead 71 to the G1 grid of the flying spot scanner tube 10 to a level sufficient to cut off the beam in the flying spot scanner tube 10. The beam remains cut off so long as the silicon controlled rectifier 90 continues to conduct.

It should be noted that the capacitor 98 commences recharging in a conventional manner immediately after its discharge through the unijunction transistor 101, so that the oscillator 100 continues to operate. Operation of the oscillator circuit 100, however, has no additional affect on the circuit since the silicon controlled rectifier 90 remains conductive after the first pulse applied to its gate and additional pulses applied thereto do not change this state of conduction.

If the ganged movable switch contacts 43, 44, 50, and 51 once again are moved to their upper "play" position, the conductive path for the silicon controlled rectifier 90 is broken, so that the potential on the emitter of the transistor 78 rises to its former value, reestablishing the beam in the flying spot scanner tube 10. Movement of the movable contact 50 to engage the contact 50*a* couples ground potential through the contacts 93, 93*a* of the reset switch and the contacts 50, 50*a* to the upper side or terminal of the capacitor 98, causing the capacitor 98 to be fully discharged in preparation of the next "still" cycle of operation of the circuit.

It is possible, however, to reset the "still" cycle of operation with the ganged movable switch contacts 43, 44, 50, and 51 remaining in their lower position corresponding to the "still" mode of operation, even after the silicon controlled rectifier 90 has been rendered conductive, terminating or cutting off the beam in the flying spot scanner tube 10. The resetting operation is accomplished by moving the ganged reset switches 93 and 94 momentarily to the lower contacts 93*b*, 94*b* associated therewith. When this is done, the movable contact 93 applies ground potential through the contact 93*b* to the upper terminal of the capacitor 98, discharging it to ground thereby readying the relaxation oscillator 100 for a complete cycle of operation.

At the same time, when the movable contact 93 is moved to its lower position, the path to ground from the cathode of the silicon controlled rectifier 90 is broken, causing the silicon controlled rectifier 90 to be rendered nonconductive. Thus, the beam is reestablished in the flying spot scanner tube 10. Simultaneously, with the movement of the lower movable contact 93 of the reset switch to its lower position, the upper contact 94 is moved to its lower position to break the charging path through the resistors 96 and 97 to the capacitor 98 and to remove the source of B+ operating potential applied through the switch 51 to the silicon controlled rectifier 90 and the unijunction transistor 101. Upon reestablishment of the reset switch to its upper position as shown in the drawing, the cycle of operation for the circuit in the "still" mode commences, with the unijunction timing circuit once again commencing to time out the time duration of operation of the player in the "-still" mode of operation. At the end of this time duration, a gating pulse again is applied to the gate of the silicon controlled rectifier 90 when the unijunction transistor 101 is rendered conductive. The silicon controlled rectifier 90 again conducts, causing the beam in the flying spot scanner tube 10 once again to be cut off, as described previously.

I claim:

1. In an electronic video player having film transporting apparatus for continuously moving film past a film gate with the player operated in a play mode of operation, a flying spot scanner producing a beam to generate a moving spot of light on a display screen thereof in a raster having a predetermined horizontal-to-vertical aspect ratio for scanning the moving film at the film gate, means for stopping movement of the film to operate the player in a still mode repeatedly scanning the stopped film at the film gate, and means for changing the aspect ratio of the scanner raster to cause scanning of a smaller raster with the player in said still mode of operation; a protection circuit including in combination:

first switch means for operation to one or the other of first and second positions corresponding, respectively, to a play mode and a still mode of operation of said player;

static latching switch means having a trigger input;

means for completing a conductive path through said static latching switch means and said first switch means with said first switch means in its second position, said path being opened with said switch means in its first position, said static latching switch means being normally nonconductive and being rendered conductive by the application of a trigger pulse thereto;

interval timer means having a timer output and responsive to operation of said first switch means from its first to its second position for providing a timer output pulse a predetermined time interval after such operation of said first switch means with said first switch means remaining in its second position;

means coupling the timer output of said interval timer means with the trigger input of said static latching switch means for applying the timer output pulse to said static latching switch means as a trigger pulse to render said static latching switch means conductive; and means responsive to conduction of said static latching switch means to cut off the beam in said flying spot scanner.

2. The combination according to claim 1 wherein said interval timer means includes charge storage means having first and second terminals, with the first terminal connected with a point of reference potential and the second terminal connected through a charging path to a source of charging potential with said first switch means operated to its second position, and threshold responsive circuit means connected to the second terminal of said charge storage means for producing the timer output pulse in response to attainment of a predetermined charge by said charge storage means, operation of said first switch means to said first position connecting said point of reference potential with said second terminal of said charge storage means, thereby disabling said interval timer means.

3. The combination according to claim 2 wherein said static latching switch has first and second terminals through which the conductive path is completed and said first switch means includes first and second movable contacts, and at least first, second and third stationary contacts; means connecting the first movable contact to a source of charging potential; means connecting the second movable contact to the point of reference potential; first circuit means coupling said first stationary contact with the charging path for said charge storage means, operation of said first switch means to its second position causing said first movable contact to engage said first stationary contact; second circuit means coupling said second stationary contact to the second terminal of said static latching switch; with said first switch means operated to said second position causing said second movable contact to engage said second stationary contact to complete the conductive path between said static latching switch and the point of reference potential; and means coupling the second terminal of said charge storage device with said third stationary contact, with operation of said first switch means to its first position causing said second movable contact to engage said third stationary contact to prevent charging of said storage device.

4. In an electronic video film player having film transporting apparatus for continuously moving film past a film gate with the player operated in a play mode of operation, a flying spot scanner producing a beam to generate a moving spot of light on a display screen thereof in a raster having a predetermined horizontal-to-vertical aspect ratio for scanning the moving film at the film gate, means for stopping movement of the film to operate the player in a still mode to repeatedly scan the stopped film at the film gate, and means for changing the aspect ratio of the raster to cause scanning of a smaller raster with the player in a still mode of operation; a protection circuit including in combination:

first switch means including at least first and second movable contacts coupled for simultaneous movement between first and second positions corresponding, respectively, to a play mode and a still mode of operation of said player;

a first stationary contact for engagement by said first movable contact in said second position thereof;

second and third stationary contacts for engagement with said second movable contact in said second and first positions, respectively;

a source of operating potential;

static latching switch means connected between said source of operating potential and said second stationary contact and having a gating input responsive to the application of a gating pulse thereto for rendering said static latching switch conductive;

relaxation oscillator means including a timing capacitor with first and second terminals connected between a point of reference potential and a first junction, respectively, said oscillator producing an output pulse with a predetermined charge being attained by said timing capacitor;

means supplying the output pulse of said relaxation oscillator to the gating input of said static latching switch as a gating pulse therefor;

charging path means connected between the second terminal of said timing capacitor and said first stationary contact;

first circuit means connecting the second terminal of said timing capacitor with said third stationary contact;

second circuit means for coupling said first movable contact with said source of operating potential;

third circuit means coupling said second movable contact with the point of reference potential; and fourth circuit means responsive to conduction of the static latching switch for blanking the beam in the flying spot scanner.

5. The combination according to claim 4 wherein said static latching switch comprises a silicon controlled rectifier having an anode, cathode and gate, the anode of which is coupled with said source of operating potential and the cathode of which is connected to said second stationary contact, a conduction path through the silicon controlled rectifier being completed with said first switch means being operated to its second position wherein said second movable contact engages said second stationary contact to complete a path from the cathode of the silicon controlled rectifier to ground, and the gate of said silicon controlled rectifier comprising gating input thereof.

6. The combination according to claim 5 wherein said flying spot scanner includes at least one control grid for establishing the beam therein, the combination further including voltage divider means connected between a source of operating potential and a point of reference potential and having a tap thereon connected with said control grid;

coupling means coupling the anode of said silicon controlled rectifier with a point on said voltage divider means to cause the potential applied to the control grid of said flying spot scanner to be at a first predetermined potential with said silicon controlled rectifier nonconductive and to be at a second predetermined potential sufficient to cut off the beam in said flying spot scanner with said silicon controlled rectifier being conductive.

7. The combination according to claim 6 further including second switch means having a third movable contact coupled with said point of reference potential, and fourth and fifth stationary contacts, said second switch means normally closed with said third movable contact engaging said fourth stationary contact; means coupling said fourth stationary contact with said second movable contact of said first switch means; and means coupling said fifth contact with the second terminal of said capacitor so that operation of said third movable contact from said fourth contact thereof to said fifth contact causes said point of reference potential to be applied to the second terminal of said capacitor thereby discharging said capacitor irrespective of the position of said first switch means.

8. The combination according to claim 6 wherein said coupling means includes a transistor having collector, base and emitter electrodes, and a zener diode means; the collector of said transistor being coupled with said control grid and the emitter of said transistor being coupled through said zener diode means to said point of reference potential, the anode of said silicon controlled rectifier being connected to the emitter of said transistor; and means for establishing a predetermined bias on the base of said transistor to render said transistor conductive at less than saturation with said silicon controlled rectifier nonconductive and to render said transistor more conductive with said silicon controlled rectifier conductive.

* * * * *